R. HUFF.
MOTOR VEHICLE.
APPLICATION FILED MAR. 20, 1911.
1,043,702.
Patented Nov. 5, 1912.
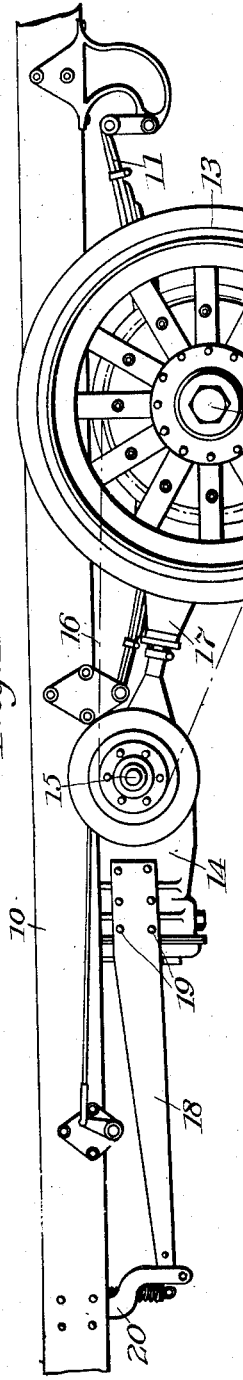
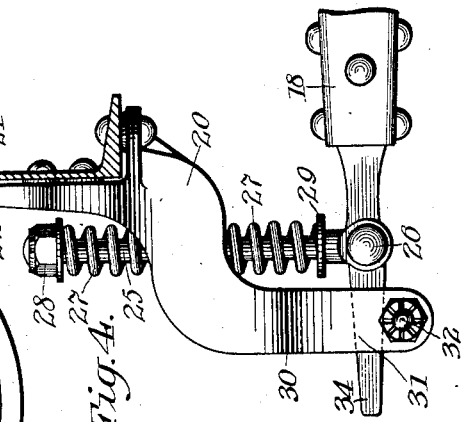
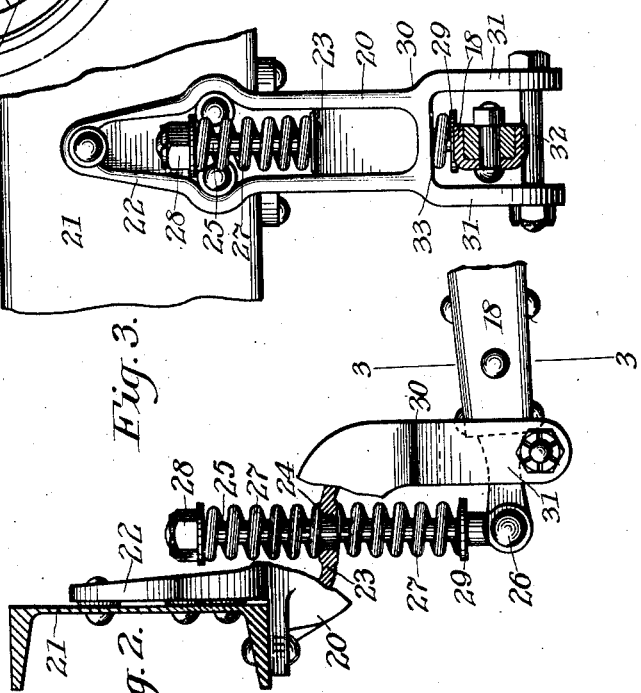
Witnesses
Inventor
Russell Huff
By Milton Tibbetts
Attorney

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,043,702.  Specification of Letters Patent.  Patented Nov. 5, 1912.

Application filed March 20, 1911. Serial No. 615,588.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This invention relates to motor vehicles and particularly to the torque or torsion rod and the bracket for supporting the latter.

It is one of the objects of this invention to simplify the construction of the connection between the torque rod and the frame and to so construct the bracket supporting the torque rod that in case the main connection between the torque rod and the bracket fails or has too much play, the torque rod will be supported by another part of the bracket independently of the main connection.

In the drawings forming a part of this specification, Figure 1 is a side elevation of a part of a motor vehicle showing some of the running gear and particularly illustrating the location of the torque rod and its connection to the frame; Fig. 2 is an enlarged view of the torque rod bracket showing the torque rod associated therewith; Fig. 3 is a view taken at right angles to Fig. 2 showing another view of the bracket and sectioning the torque rod on the line 3—3 of Fig. 2; and Fig. 4 is a view similar to Fig. 2 showing another form of torque rod bracket.

10 represents the motor vehicle frame, in this instance a heavy truck frame, which is suspended on the rear springs 11 on the axle 12 and wheels 13. The power is transmitted to the wheels 13 through gears in the gear box 14 and through the jack shaft 15 and sprocket chain 16, the latter shown diagrammatically. Radius or distance rods 17 are arranged between the jack shaft and the rear axle for properly spacing these members.

It will be understood that the resistance to the turning movement of the jack shaft 15 through the bevel or other driving gears must be taken by the casing 14 and in the present instance this is done through a torque rod or torsion rod 18 which is secured to the casing 14 as by bolts 19 and extends forwardly to a point adjacent a supporting bracket 20, which latter is secured to a cross member 21 of the frame 10. The cross member 21 may be of channel section as shown particularly in Fig. 2 and the bracket 20 may have an L-shaped portion 22 by which it is riveted to the cross member as shown in the drawings. The bracket is also formed with a horizontal portion 23 in which there is a vertical opening 24 to receive loosely a bolt 25 which is pivoted at 26 to the forward end of the torque rod 18. Above and below the ledge or horizontal portion 23 of the bracket are springs 27 on the bolt 25 and the latter is provided with an adjustable nut 28 on its upper or free end. Thus the springs may be placed under tension between the nut 28 and a shoulder 29 adjacent the pivoted end of the bolt, with the ledge 23 arranged between the springs. By this arrangement the upward and downward strains of the torque rod 18 are cushioned against the bracket 20. The nut 28 is usually locked to the bolt 25 by a cotter pin or otherwise, but even with this protection it has been found that failure of the nut or of the springs or of some other vital part of the spring connection between the torque rod 18 and the bracket 20 sometimes takes place and without further provision than has already been described, in such emergency there would be nothing left to support the torque rod and serious accident might result. To provide for supporting the torque rod in either its upward or its downward movement in case of failure of the spring connection between the torque rod and the bracket 20, and for the further purpose of limiting the upward and downward movement of the torque rod due to weakness or loose adjustment of the springs 27, the bracket 20 in the present invention is provided with a downwardly extending portion 30 having separated arms 31 between which the torque rod 18 is adapted to pass. The ends of the arms 31 are connected by a bolt 32 against which the torque rod may abut in case of failure of the spring connection referred to or for the purpose of limiting the downward thrust of this rod and it will be seen that the upward thrust of the torque rod will be taken by the shoulder 33 of the downwardly extending portion 30 of the bracket.

In motor vehicle construction it is often found desirable to construct vehicles alike in all other respects but with different wheel bases to take different shapes and sizes of bodies and it is desirable to do this with as little change as possible in the various parts that go to make up the chassis. Therefore it will be seen that the bracket construction hereinabove described is particularly advantageous in that it may be reversed as shown in Fig. 4 so that the horizontal portion 23 extends forwardly from the supporting part of the bracket instead of rearwardly as in Fig. 2, thus accommodating itself to a vehicle with a shorter wheel base in which the gear case 14 is moved somewhat forwardly. It will be noticed that all of the other parts shown in Fig. 4 are identical with those shown in Fig. 2 except that the torque rod 18 is provided with an extension 34 beyond the pivot 26, which extension is arranged between the bolt 32 and the shoulder 33 for the purpose of supporting the torque rod in case of failure of the spring connection, as in the other form.

Having thus described my invention, what I claim is:

1. In a motor vehicle, the combination with the frame, the gear casing, and a torque rod extending from the gear casing, of a bracket on the frame arranged adjacent the end of the torque rod, a spring connection between the torque rod and said bracket, and means for supporting the torque rod upon failure of the spring connection.

2. In a motor vehicle, the combination with the frame, the gear casing, and a torque rod extending from the gear casing, of a bracket on the frame arranged adjacent the end of the torque rod, a spring connection between the torque rod and said bracket, and means to prevent turning of the torque rod in either direction upon failure of the spring connection.

3. In a motor vehicle, the combination with the frame and the torque rod, of a bracket, and a spring connection between the torque rod and the bracket, said bracket having parts extending above and below said torque rod to limit the upward and downward movements thereof.

4. In a motor vehicle, the combination with the frame and the torque rod, of a bracket secured to the frame and comprising a horizontal portion and spaced downwardly extending arms, a connecting bolt pivoted to said torque rod and passing through a hole in the horizontal portion of said bracket, a stop on the free end of said bolt, springs on the bolt above and below said bracket, a part of said torque rod passing through between said arms, and a bolt connecting the ends of said arms, whereby the upward and downward movement of said torque rod is limited.

In testimony whereof I affix my signature in the presence of two witnesses.

RUSSELL HUFF.

Witnesses:
W. H. FINCKEL, Jr.,
RICHARD E. MANTON.

Copies of this patent may be obtained for five cents each, by addressing the "Commissioner of Patents, Washington, D. C."